(12) United States Patent
Porikli et al.

(10) Patent No.: US 7,756,296 B2
(45) Date of Patent: Jul. 13, 2010

(54) METHOD FOR TRACKING OBJECTS IN VIDEOS USING FORWARD AND BACKWARD TRACKING

(75) Inventors: Fatih M. Porikli, Watertown, MA (US); Xue Mei, Catonsville, MD (US); Dirk Brinkman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 777 days.

(21) Appl. No.: 11/691,886

(22) Filed: Mar. 27, 2007

(65) Prior Publication Data

US 2008/0240497 A1    Oct. 2, 2008

(51) Int. Cl.
*G06K 9/00* (2006.01)
*H04N 13/00* (2006.01)

(52) U.S. Cl. ............. 382/103; 382/236; 348/42

(58) Field of Classification Search ........... 382/100, 382/103, 106, 107, 168, 173, 181, 194, 209, 382/232, 236, 237, 251, 254, 260, 274, 275, 382/276, 291–294, 305, 312; 375/240.12; 348/42

See application file for complete search history.

(56) References Cited

U.S. PATENT DOCUMENTS

| 6,590,999 | B1 * | 7/2003 | Comaniciu et al. ........... 382/103 |
| 6,901,110 | B1 * | 5/2005 | Tsougarakis et al. ... 375/240.12 |
| 6,911,995 | B2 * | 6/2005 | Ivanov et al. ................. 348/42 |
| 7,636,453 | B2 * | 12/2009 | Porter et al. ................. 382/103 |
| 2006/0262959 | A1 * | 11/2006 | Tuzel et al. ................. 382/103 |

* cited by examiner

*Primary Examiner*—Seyed Azarian
(74) *Attorney, Agent, or Firm*—Dirk Brinkman; Gene Vinokur (57) ABSTRACT

A method tracks an object in a sequence of frames of a video. The method is provided with a set of tracking modules. Frames of a video are buffered in a memory buffer. First, an object is tracked in the buffered frames forward in time using a selected one of the plurality of tracking module. Second, the object is tracked in the buffered frames backward in time using the selected tracking module. Then, a tracking error is determined from the first tracking and the second tracking. If the tracking error is less than a predetermined threshold, then additional frames are buffered in the memory buffer and the first tracking, the second tracking and the determining steps are repeated. Otherwise, if the error is greater than the predetermined threshold, then a different tracking module is selected and the first tracking, the second tracking and the determining steps are repeated.

15 Claims, 10 Drawing Sheets

METHOD FOR TRACKING OBJECTS IN VIDEOS USING FORWARD AND BACKWARD TRACKING

FIELD OF THE INVENTION

This invention relates generally to computer vision applications, and more particularly to tracking an object in a sequence of frames of a video.

BACKGROUND OF THE INVENTION

In a sequence of frames, i.e., a video, an object can be tracked by determining correspondences of features of the object from frame to frame. However, accurately tracking a deforming, non-rigid and fast moving object continues to be a difficult computer vision problem.

Tracking can be performed with a mean-shift operator, Comaniciu et al., "Real-time tracking of non-rigid objects using mean-shift," Proc. IEEE Conf. on Computer Vision and Pattern Recognition, volume 1, pages 142-149, 2000, and U.S. Pat. No. 6,590,999 to Comaniciu et al. on Jul. 8, 2003, "Real-time tracking of non-rigid objects using mean-shift." A nonparametric density gradient estimator is used to track an object that is most similar to a given color histogram. That method provides accurate localization. However, that method requires some overlap of the location of the object in consecutive frames, which will not be the case for fast moving objects where the object in two consecutive frames might appear at totally different locations. Also, because the histograms are used to determine likelihood, the gradient estimation, and convergence becomes inaccurate in case the object and background color distributions are similar.

To solve this issue, a multi-kernel mean-shift approach can be used, Porikli et al., "Object tracking in low-frame-rate video," Proc. of PIE/EI-Image and Video Communication and Processing, San Jose, Calif., 2005, and U.S. Patent Application 20060262959 by Tuzel et al, on Nov. 23, 2006, "Modeling low frame rate videos with Bayesian estimation." The additional kernels are obtained by background subtraction. In order to resolve the above convergence issue, another kernel, which 'pushes' the object away from the background regions can be adapted.

Tracking can be considered as estimation of the state given all the measurements up to that moment, or equivalently constructing the probability density function of the object location. A simple tracking approach is predictive filtering. This method uses object color and location statistics while updating an object model by constant weights, Wren et al., "Pfinder: Real-time tracking of the human body," IEEE Trans. Pattern Anal. Machine Intell., vol. 19, pp. 780-785, 1997, and U.S. Pat. No. 6,911,995 to Ivanov et al. on Jun. 28, 2005, "Computer vision depth segmentation using virtual surface. "An optimal solution is provided by a recursive Bayesian filter, which solves the problem in successive prediction and update steps.

When the measurement noise is assumed to be Gaussian distributed, one solution is provided by a Kalman filter, which is often used for tracking rigid objects, Boykov et al., "Adaptive Bayesian recognition in tracking rigid objects," Proc. IEEE Conf. on Computer Vision and Pattern Recognition, volume 2, pages 697-704, 2000, and Rosales et al., "A framework for heading-guided recognition of human activity," Computer Vision and Image Understanding, volume 91, pages 335-367, 2003. The Kalman filter is confined to predefined state transition parameters that control a 'viscosity' of motion properties of the object.

When the state space is discrete and consists of a finite number of states, Markovian filters can be applied for object tracking. The most general class of filters is represented by particle filters, which are based on Monte Carlo integration methods. A current density of a particular state is represented by a set of random samples with associated weights. A new density is then based on the weighted samples.

Particle filters can be used to recover conditional density propagation for visual tracking and verification. Generally, particle filtering is based on random sampling, which is a problematic issue due to sample degeneracy and impoverishment, especially for high dimensional problems. A kernel based Bayesian filter can be used for sampling a state space more effectively. A multiple hypothesis filter evaluates a probability that a moving object gave rise to a certain measurement sequence.

As a problem, all of the above filter based methods can easily 'get stuck' in local optimum. As another concern, most prior art methods lack a competent similarity criterion that expresses both statistical and spatial properties. Most prior art methods either depend only on color distributions, or structural models.

Many different representations, from aggregated statistics to appearance models, have been used for tracking objects. Histograms are popular because normalized histograms closely resemble a probability density function of the modeled data. However, histograms do not consider spatial arrangement of the feature values. For instance, randomly rearranging pixels in an observation window yields the same histogram. Moreover, constructing higher dimensional histograms with a small number of pixels is a major problem.

Appearance models map image features, such as shape and texture, onto a uniform sized window of tensors. Because of the exponential complexity, only a relatively small number of features can be used. Thus, each feature must be highly discriminant. The reliability of the features strictly depends on the object type. Appearance models tend to be highly sensitive to scale variations, and are also pose dependent.

Tracking, that is finding regions corresponding to an object in a sequence of frames, has faces similar challenges. Objects frequently change their appearance and pose. The objects can be occluded partially or completely, or objects can merge and split. Depending on the application, objects can exhibit erratic motion patterns, and often make sudden turns.

Tracking can also be considered as a classification problem and a classifier can be trained to distinguish the object from the background, Avidan, "Ensemble tracking," Proc. IEEE Conf. on Computer Vision and Pattern Recognition, San Diego, Calif., 2005, and U.S. Patent Application 20060165258 by Avidan, filed Jul. 27, 2006, "Tracking objects in videos with adaptive classifiers." This is done by constructing a feature vector for every pixel in the reference image and training a classifier to separate pixels that belong to the object from pixels that belong to the background. Integrating classifiers over time improves the stability of the tracker in cases illumination changes. As in the mean-shift, an object can be tracked only if its motion is small. This method can confuse objects in case of an occlusion.

Object representation, which is how to convert color, motion, shape, and other properties into a compact and identifiable form such as a feature vector, plays critical role in tracking. Conventional trackers either depend only on color histograms, which disregard the structural arrangement of pixels, or appearance models, which ignore the statistical properties. There are several shortcomings of these representations. Populating higher dimensional, histograms by a small number of pixels results in an incomplete representation.

Besides, histograms are easily distorted by noise. Appearance models are sensitive to the scale changes and localization errors.

Covariance matrix representation embodies both spatial and statistical properties of objects, and provides an elegant solution to fusion of multiple features, [18] O. Tuzel, F. Porikli, and P. Meer, "Region covariance: A fast descriptor for detection and classification," in Proc. 9th European Conf. on Computer Vision, Graz, Austria, 2006. Covariance is a measure of how much the deviation of two or more variables or processes match. In tracking, these variables correspond to point features such as coordinate, color, gradient, orientation, and filter responses. This representation has a much lower dimensionality than histograms. The representation is robust against noise and lighting changes. To track objects using covariance descriptor, an eigenvector based distance metric is adapted to compare the matrices of object and candidate regions. A covariance tracker does not make any assumption on the motion. This means that the tracker can keep track of objects even if their motion is erratic and fast. It can compare any regions without being restricted to a constant window size. In spite of these advantages, the computation of the covariance matrix distance for all candidate regions is slow and requires exponential time.

An integral image based method, which requires constant time, can improve the speed, Porikli, "Integral histogram: A fast way to extract histograms in Cartesian spaces," Proc. IEEE Conf. on Computer Vision and Pattern Recognition, San Diego, Calif., vol. 1, pp. 829-836, 2005, and U.S. Patent Application 20060177131 by Porikli on Aug. 10, 2006, "Method of extracting and searching integral histograms of data samples." This technique significantly accelerates the covariance matrix extraction process by taking advantage of the spatial arrangement of the points.

As many vision tasks, object detection and tracking also benefit from specific hardware implementations. Such implementations contain various combinations of different subsystems such as conventional digital signal processors (DSP), graphic processor units (GPU), field programmable gate arrays (FPGA), application specific integrated circuits (ASIC), and other reconfigurable cores. DSPs offer software programmability, which is a cost-effective. With a programmable DSP architecture, it is possible to speed up fundamental low-level algorithms. On the other hand, ASICs offer a high performance, low power, and low cost option for implementing methods, but supporting different tracking methods requires an expanding number of ASICs, leading to larger devices, greater power consumption, and higher cost. GPUs also allow construction of economical and parallel architectures. Several computational intensive processes, including contrast enhancement, color conversion, edge detection, and feature point tracking, can be offloaded to GPUs. FPGAs enable large-scale parallel processing and pipelining of data flow. FPGAs provide significant on-chip RAM and support high clock speeds. However, current on-chip RAMs are not sufficient to support a useful level of internal RAM frame buffering in object detection and tracking. Therefore, additional external memory is required to provide storage during processing of image data. The high I/O capability of FPGAs supports access to multiple RAM banks simultaneously, enabling effective and efficient pipelining.

Tracking methods have numerous issues to overcome. Likelihood score computation between the object and candidate regions is a bottleneck. Tracking methods employing histograms become more demanding as the histogram size increases. Some histogram distance metrics, e.g., Bhattacharya, and KL, are inherently complex. For covariance tracking, the likelihood computation requires extraction of eigenvectors, which is slow. Fast likelihood computation methods can significantly improve the computational speed.

Complexity is proportional to the number of the candidate regions, or the search region size. Hierarchical search methods can be applied to accelerate the tracking process. Localized search methods such as mean-shift and ensemble tracking become slower as the object size becomes larger. Adaptive scaling of the kernels and images without destroying the salient information can be adapted to achieve a real-time performance. Kernel based tracking methods becomes more demanding as the number of objects increases. Global search methods can be applied for applications that require tracking of a multitude objects. Therefore, there is a need for tracking objects with uncontrollable conditions.

SUMMARY OF THE INVENTION

A method tracks an object in a sequence of frames of a video. The method is provided with a set of tracking modules.

Frames of a video are buffered in a memory buffer. First, an object is tracked in the buffered frames forward in time using a selected one of the plurality of tracking modules. Second, the object is tracked in the buffered frames backward in time using the selected tracking module.

Then, a tracking error is determined from the first tracking and the second tracking. If the tracking error is less than a predetermined threshold, then additional frames are buffered in the memory buffer and the first tracking, the second tracking and the determining steps are repeated.

Otherwise, if the error is greater than the predetermined threshold, then a different tracking module is selected and the first tracking, the second tracking and the determining steps are repeated.

DETAILED DESCRIPTION OF THE PREFERRED EMBODIMENTS

Figure 1:
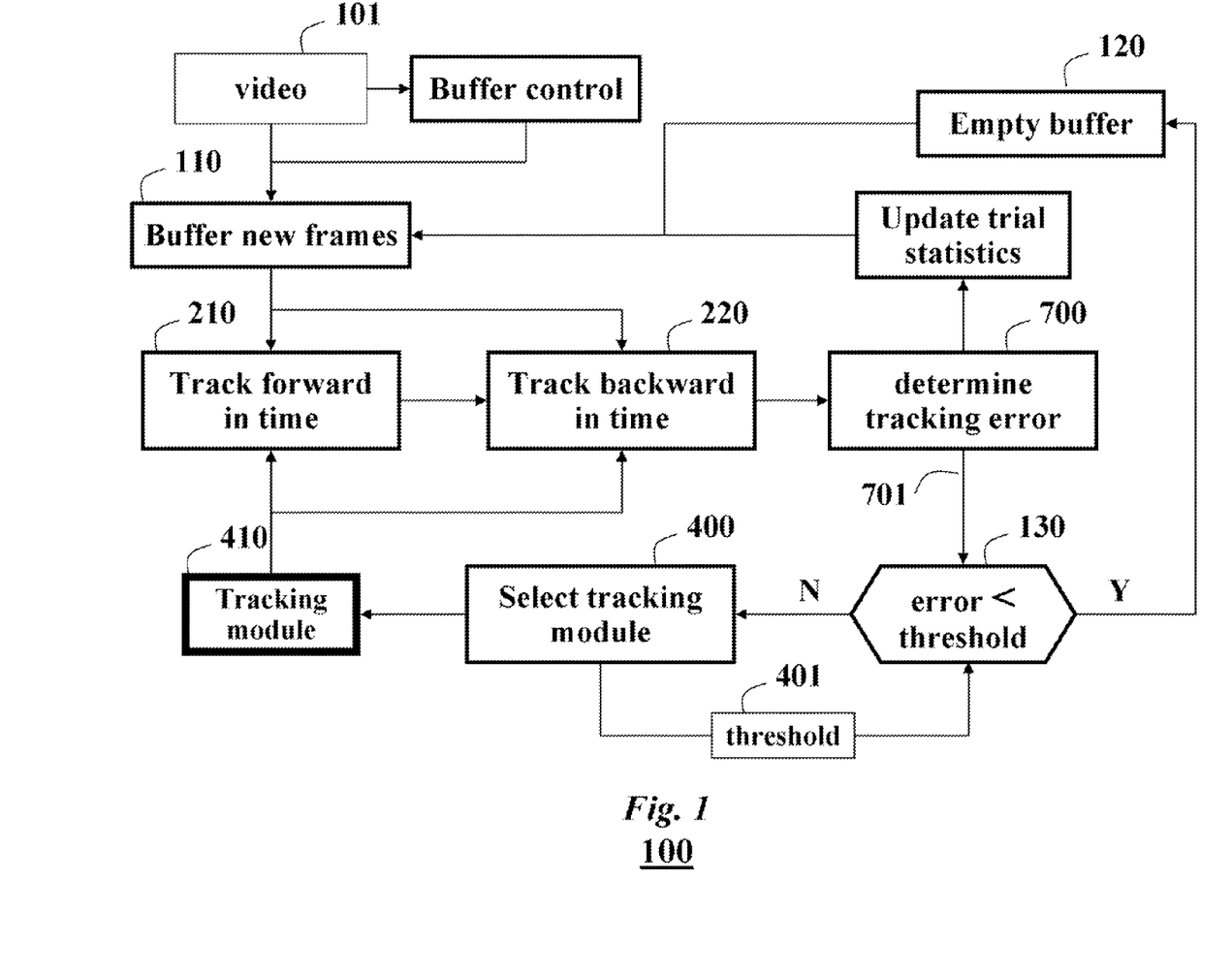
FIG. 1 is a block diagram of a method for tracking an object according to an embodiment of the invention.

FIG. 1 shows a method for tracking an object in a sequence of frames of a video 101 according to an embodiment of our invention. A tracking module 410 is selected. The selection of tracking modules is described below. New frames, e.g., five frames, from the video 101 are buffered 110 in a memory. The object is forward tracked 210 in time in the buffered frames using the tracking module. Then, the object is backward tracked 220 in time. After the forward and backward tracking a tracking error 701 is determined 700. If the error 701 is less than a predetermined threshold 401, then the memory buffer is emptied, and additional frames are buffered 110 until all frames of the video are processed.

Otherwise, if the error 701 is greater than the predetermined threshold, then a different tracking module is selected 400, and the forward and backward tracking for the current frames in the buffer are repeated.

Figure 8:
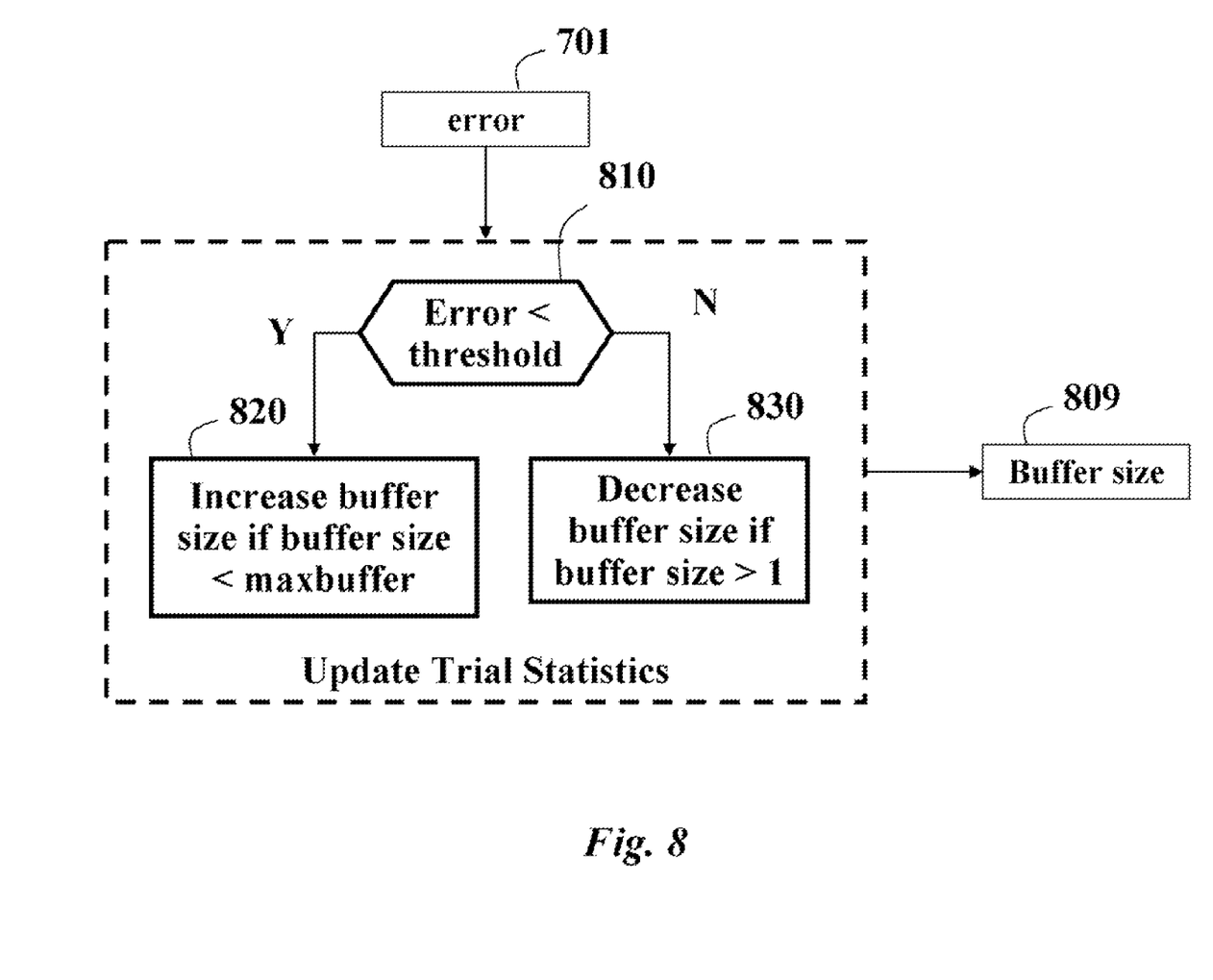
FIG. 8 is a block diagram of updating the trial statistics according to an embodiment of the invention.

We can use trial statistics, see FIG. 8, which evaluates whether the previously assigned trackers generated a satisfactory result or not, to determine a buffer size 809. Depending on the tracking error, we change the number of frames in the buffer for the next time we buffer new frames.

In case the error is less than a predetermined threshold 810 and the number of frames in the buffer is smaller than a maximum frame count, we increase 820 the size of the buffer for the next time we buffer the frames. If the tracking error is more than the threshold, then we decrease 830 the size of the buffer. The minimum number of frames in the buffer is set to one.

Figure 9:
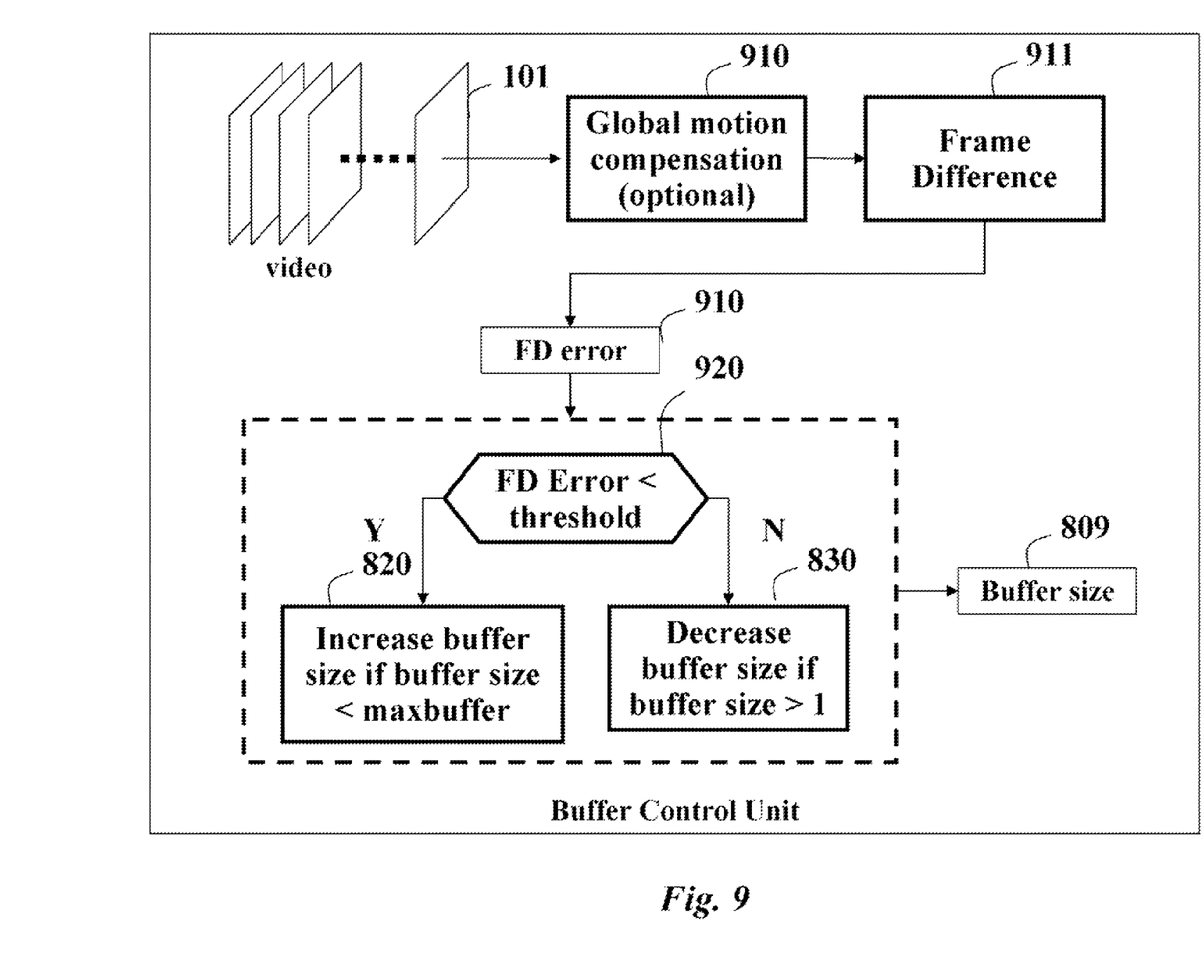
FIG. 9 is a block diagram of buffer control unit according to an embodiment of the invention.
Figure 10:
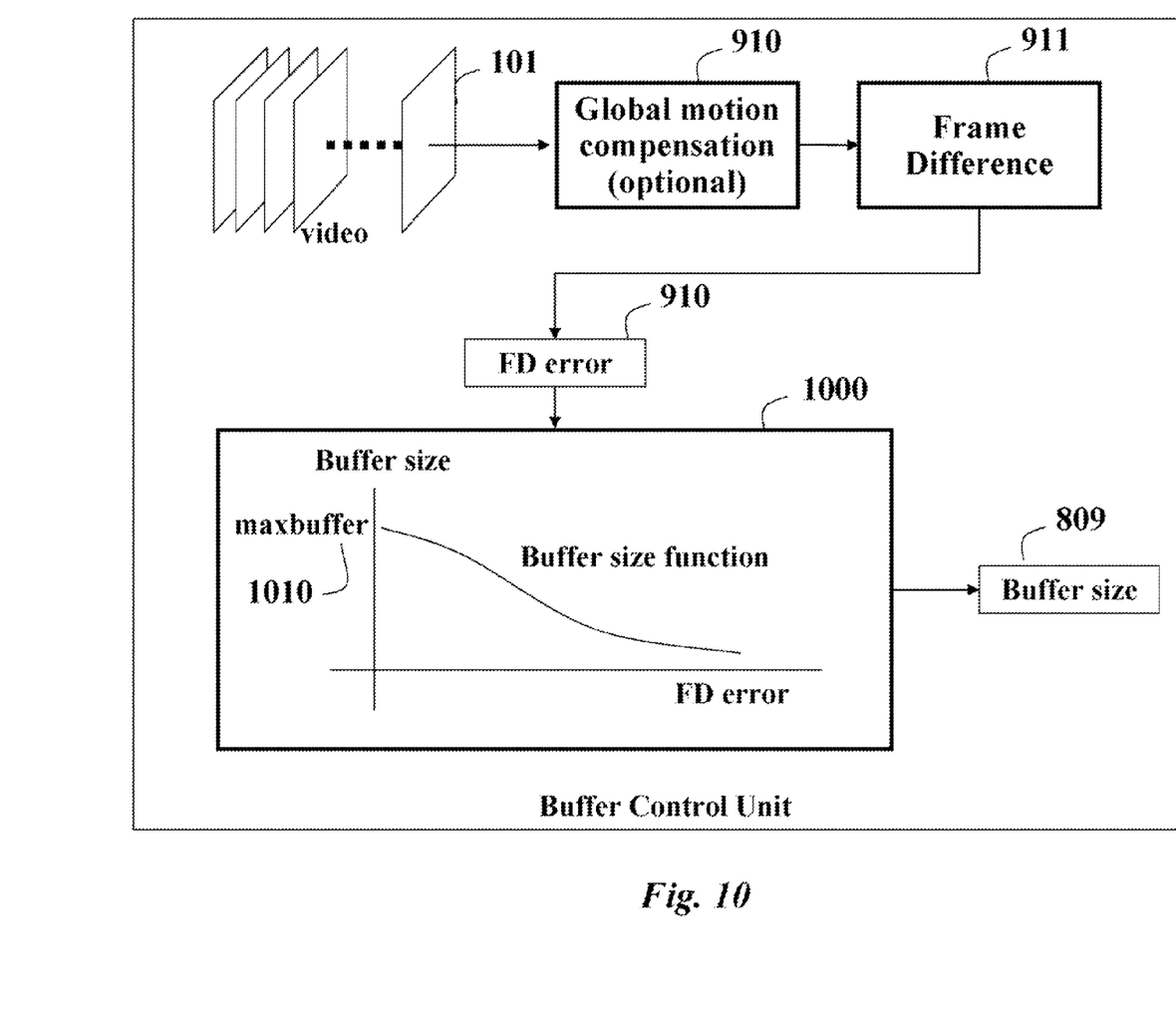
FIG. 10 is a block diagram of buffer control unit according to an embodiment of the invention.

Alternatively, as shown in FIG. 9, we set the buffer size 809 using the amount of frame difference (FD) error 910 in a buffer control unit, see FIGS. 9-10. We determine 910 the global motion between two consecutive frames by estimating parameterized motion to obtain a frame difference 911. We can either use the whole image or a part of the image to estimate motion parameters. Then, using the motion parameters, we apply a mapping from one image pixel coordinates to other image to find the corresponding pixels pairs. This operation can be called motion compensation. For static cameras, the motion compensation is omitted since there is no camera motion. We determine a frame difference error by aggregating the intensity differences of corresponding pixels in two frames. We apply 920 a threshold to the frame difference error to change the size of the buffer.

A second embodiment, see FIG. 10, uses the frame difference error and a buffer size function 1000, which is a nonlinear mapping, to determine the buffer size. The buffer size can be defined between a maximum size (maxbuffer) 1010, and a size of one frame.

Figure 2:
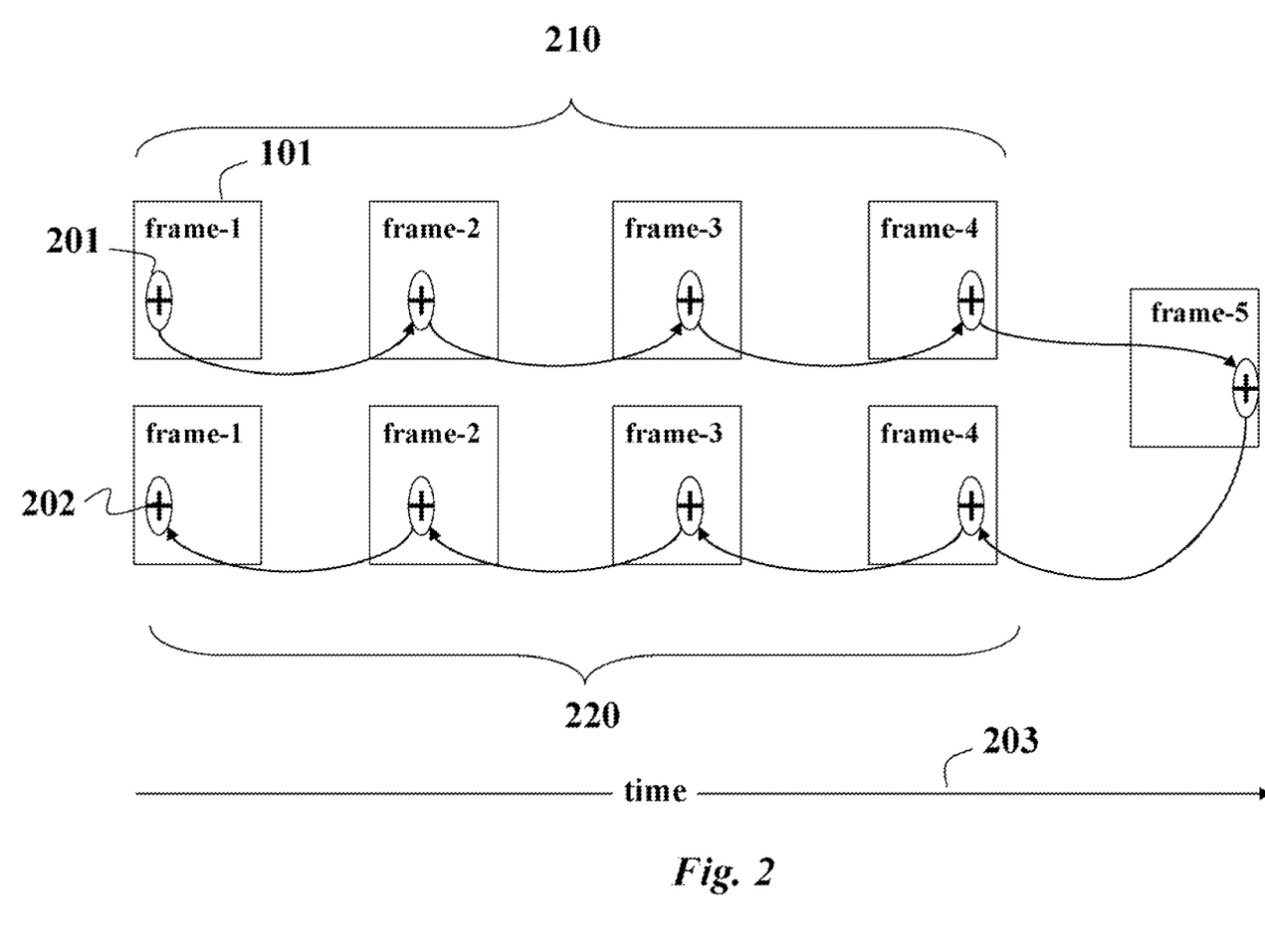
FIG. 2 is a block diagram of tracking with a low error.
Figure 3:
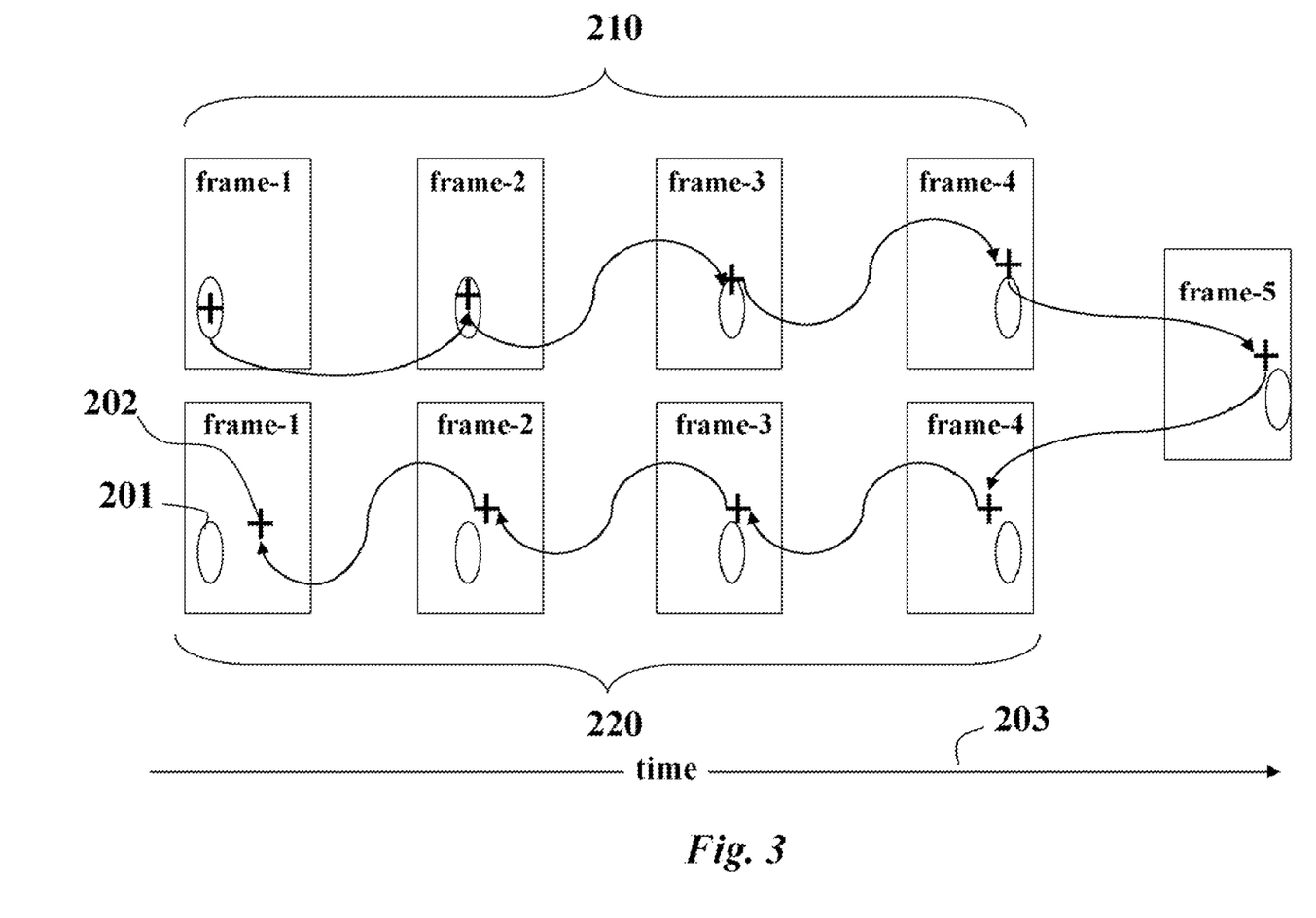
FIG. 3 is a block diagram of tracking with a high error.

FIG. 2 shows the forward and backward tracking for five frames in the case the tracking error is relatively small, while FIG. 3 shows the case where the tracking error is relatively large. In FIGS. 2 and 3, the object is represented by the oval 201, and the tracked location of the object is represented by a crosshair or reticle (+) 202. As can be seen in FIG. 3, there is considerable 'drift' between the actual object location 201, and the tracked location 202 over time 203.

Figure 4:
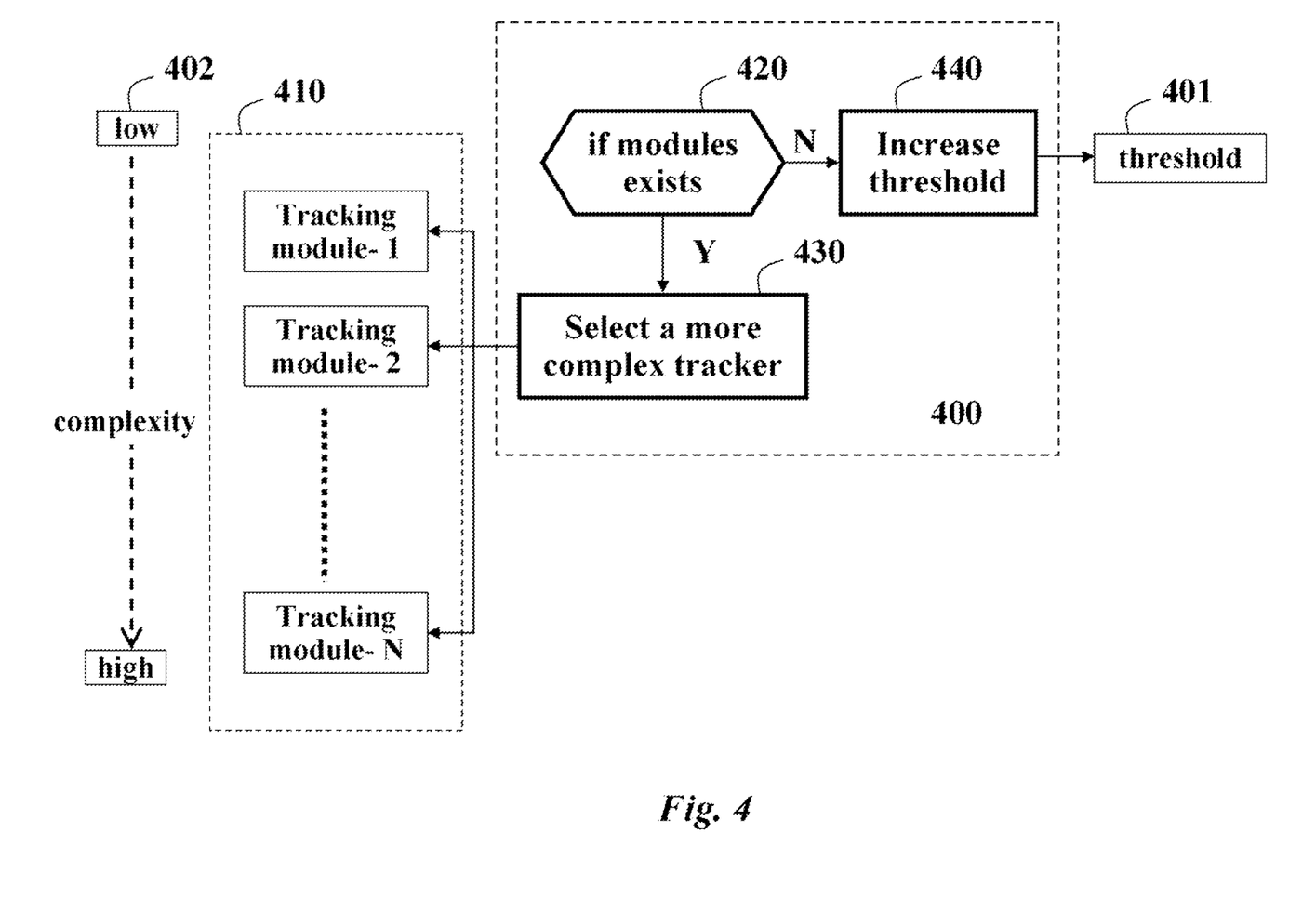
FIGS. 4-6 are block diagrams of selecting tracking modules according to embodiments of the invention.

FIG. 4 shows the details of selecting 400 a tracking module. Our method has access to a number of tracking modules 410. The set of tracking modules can comprises a mean-shift tracker, a particle filter tracker, a covariance tracker, a Kalman filter tracker, an ensemble tracker, an exhaustive search tracker, and an online classifier tracker, or other similar known trackers. The trackers can be arranged in a high to low complexity order 402. Therefore, the selector 400 determines 420 if any more modules exist, and if yes, selects 430 an appropriate module. Otherwise if not, the threshold 401 is increased 440. 11. The complexity for the particle filter tracker is a number of particles, for the mean-shift filter tracker the complexity is a size of the kernel, for the Kalman filter tracker and the exhaustive search tracker it is a size of the search region, for the covariance tracker it is a number of features, and for the online classifier tracker and the ensemble tracker the complexity is a number of classifiers. Therefore, it is also possible to change the complexity of the tracker module based on the tracking error, for example the number of particles, the size of the kernel, the number of features, the size of the search region, or the number of classifiers.

The selection is based on multiple constrains. We select a more complex tracker in case the tracking error is large, and a low complexity tracker in case the tracking error is small. There are a multitude of complexity measures we utilize. Between different types of tracking methods, complexity indicates the computational complexity. Some tracking methods are more robust to noise, etc. than others, thus, complexity also refers to the degree of robustness.

For the same tracker type, complexity means the computational load and the range of the tracking parameters. For local search based trackers, e.g., gradient shift, Kalman, etc, more complex indicates a larger search or kernel window. For sampling based trackers, e.g., particle filter, etc, the complexity corresponds to the number of particles and the quantization steps (precision) of the particle states.

Figure 5:
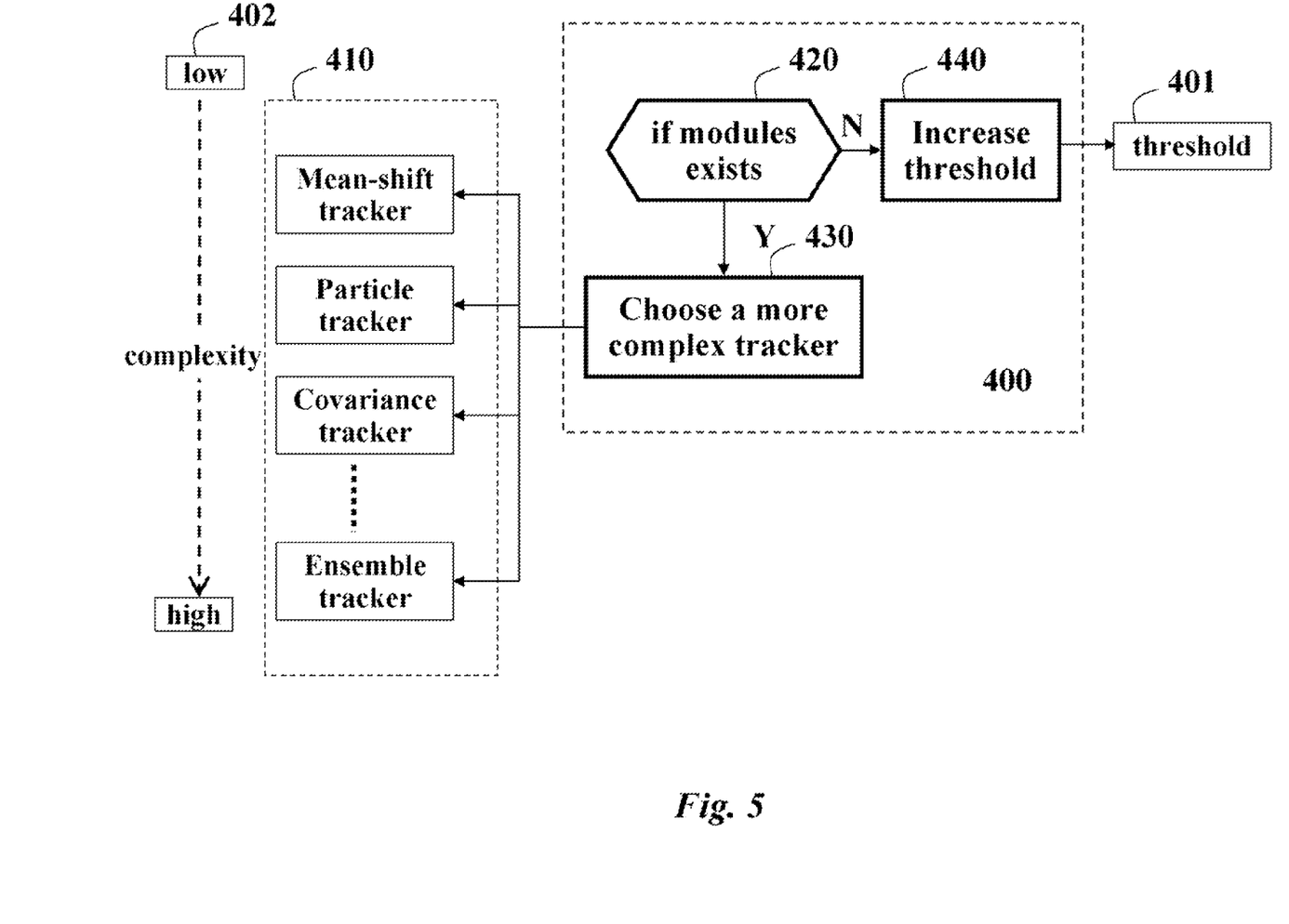

FIG. 5 show some example tracking modules, e.g., meanshift, particle, covariance and ensemble trackers 410. A low complexity tracker would be faster, and use fewer resources than a high complexity tracker. However, a low complexity tracker might not be able to track an object undergoing erratic, fast motion, or drastic appearance changes. Therefore, our tracking adapts the tracker 410 to the complexity of the tracking process.

Figure 6:
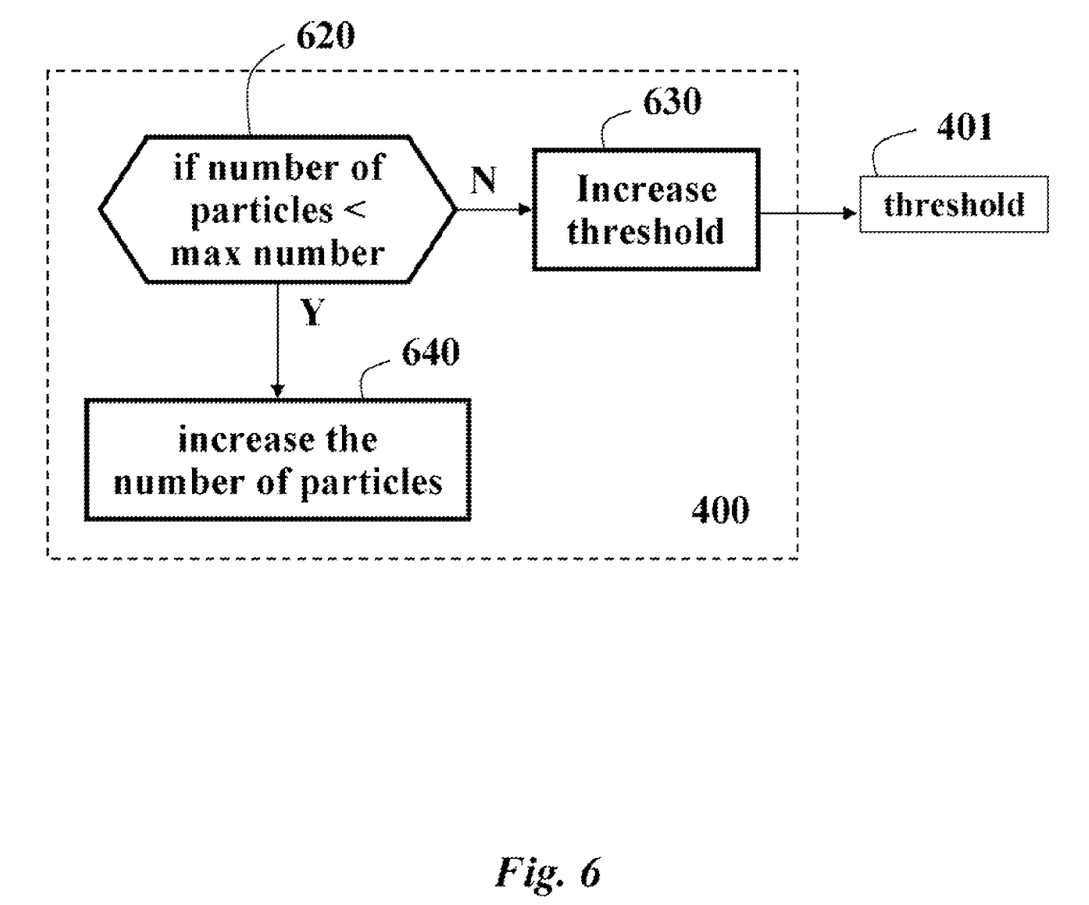

FIG. 6 shows how a complexity of a specific tracker can be changed. For example, if the selected tracker is a particle tracker. In this case, determine 620 if a number of particles is less than a maximum, if not, increase 630 the threshold. Otherwise, if yes, increase the number of particles used to track the object.

Figure 7:
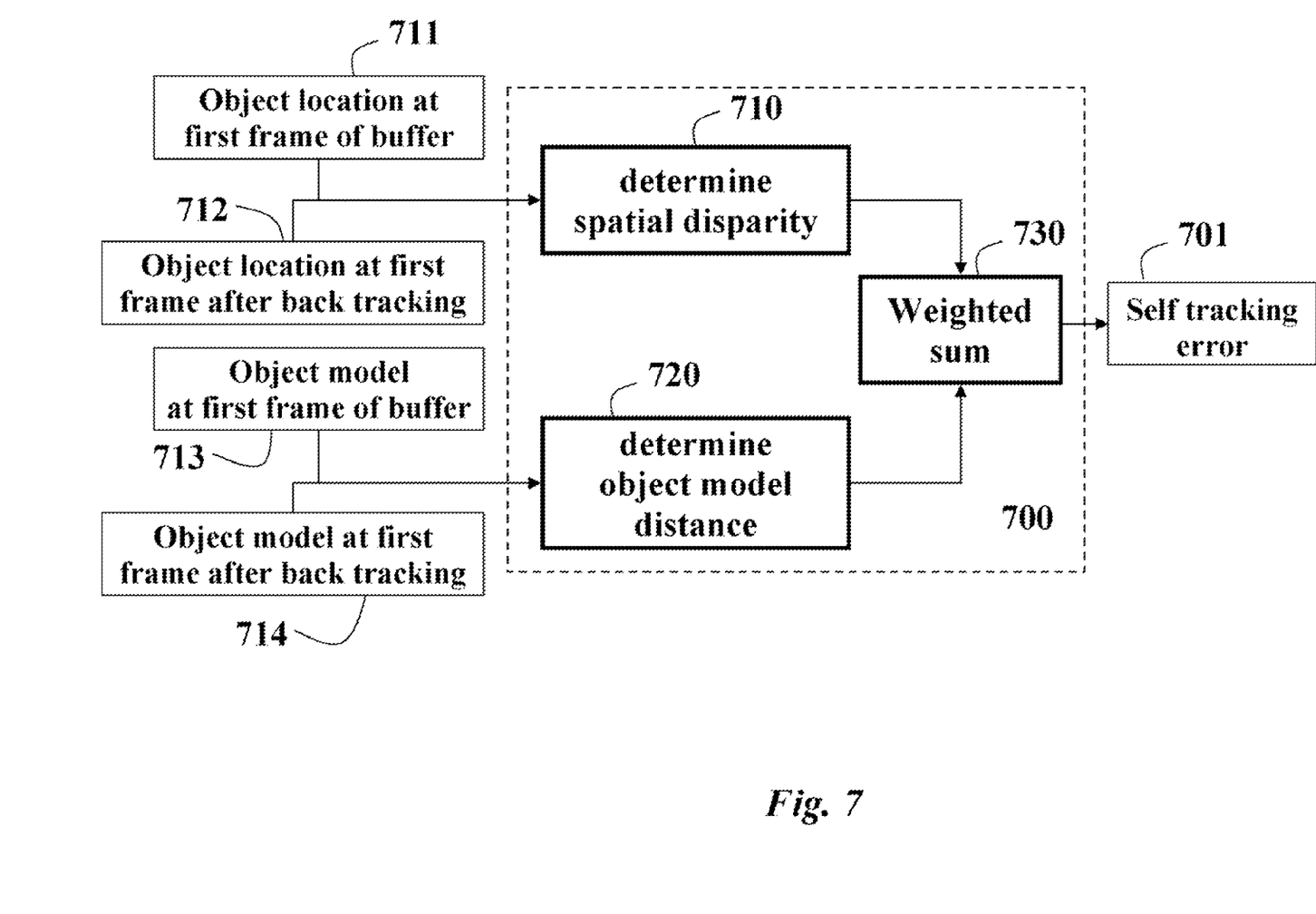
FIG. 7 is a block diagram of determining a tracking error according to an embodiment of the invention.

FIG. 7 shows the details of determining 700 the tracking error 701. The tracker 410 has the location 711 of the object in the first frame and the location 712 in the first frame after backward tracking. Generally, the location is of the object is determined according to an object model. The location of the object can then be determined before tracking starts, after the forward tracking and after the backward tracking. The distance between the locations determines 710 a spatial disparity of the correct location and the tracked location. The object model 713 for the first frame and the model 714 for the last frame determine 720 an object model distance. The disparity and the object model distance can be combined in a weighted sum 730 to yield the tracking error.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for tracking an object in a sequence of frames of a video, comprising the steps of:

providing a set of tracking modules;

buffering frames of a video in a memory buffer;

first tracking an object in the buffered frames forward in time using a selected one of the plurality of tracking module second tracking the object in the buffered frames backward in time using the selected tracking module; and determining a tracking error from the first tracking and the second tracking, and if the tracking error is less than a predetermined threshold, then buffering additional frames in the memory buffer and repeating the first tracking, the second tracking and the determining steps, and otherwise if the error is greater than the predetermined threshold, then selecting a different tracking module and repeating the first tracking, the second tracking and the determining steps, wherein each tracking module has an associated complexity, and wherein the set of tracking modules is selected from a group comprising a mean-shift tracker, a particle filter tracker, a covariance tracker, a Kalman filter tracker, an ensemble tracker, an exhaustive search tracker, and an online classifier tracker.

2. The method of claim 1, further comprising:

decreasing a size of the buffer if the frame difference error is greater than a predetermined threshold, and otherwise increasing the size of the buffer if the frame difference error is less than a predetermined threshold.

3. The method of claim 2, in which the buffer size is a non linear function.

4. The method of claim 1, in which the frame difference error is a frame difference based global motion between consecutive frames in the buffer.

5. The method of claim 1, in which each tracking module has an associated complexity, and further comprising:

arranging the plurality of tracking modules in a high to low complexity order.

6. The method of claim 1, in which the different tracking module is selected based on the tracking error.

7. The method of claim 1, in which the tracking error is based on a location of the object before tracking, and after the first forward tracking followed by the second backward tracking.

8. The method of claim 1, in which the tracking error is based on an object model determined at a location of the object before tracking, after the first tracking, and after the second tracking.

9. The method of claim 1, in which the complexity is a computational load of the tracking module.

10. The method of claim 1, in which the complexity for the particle filter tracker is a number of particles.

11. The method of claim 1, in which the complexity for the mean-shift filter tracker is a size of the kernel.

12. The method of claim 1, in which file complexity for the Kalman filler tracker and the exhaustive search tracker is a size of the search region.

13. The method of claim 1, in which the complexity for the covariance tracker is a number of features.

14. The method of claim 1, in which the complexity for the online classifier tracker and the ensemble tracker is a number of classifiers.

15. The method of claim 1, further comprising:

changing the complexity of the selected tracker module based on the tracking error.

* * * * *